(12) United States Patent
Hiraguchi (10) Patent No.: US 7,438,249 B2
(45) Date of Patent: Oct. 21, 2008

(54) RECORDING MEDIUM CARTRIDGE AND FABRICATION METHOD THEREOF

(75) Inventor: Kazuo Hiraguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 45 days.

(21) Appl. No.: 11/712,966

(22) Filed: Mar. 2, 2007

(65) Prior Publication Data

US 2007/0207291 A1 Sep. 6, 2007

(30) Foreign Application Priority Data

Mar. 3, 2006 (JP) ............................. 2006-057490

(51) Int. Cl.
*G03B 23/02* (2006.01)

(52) U.S. Cl. .................. 242/348; 360/132; 428/156

(58) Field of Classification Search .............. 242/338, 242/338.1, 343, 343.1, 348, 348.2; 360/132; 428/156, 422; 427/127, 284
See application file for complete search history.

(56) References Cited

U.S. PATENT DOCUMENTS

| | | | | |
|---|---|---|---|---|
| 6,318,657 B1 * | 11/2001 | Nayak | ..................... | 242/338.1 |
| 6,667,852 B2 * | 12/2003 | Morita et al. | ................ | 360/132 |
| 7,040,564 B1 * | 5/2006 | Veno et al. | ................ | 242/338.1 |
| 7,088,552 B2 * | 8/2006 | Morita et al. | ................ | 360/132 |
| 7,322,540 B2 * | 1/2008 | Hiraguchi | ................ | 242/338.1 |

FOREIGN PATENT DOCUMENTS

JP 2005-276416 A 10/2005

\* cited by examiner

*Primary Examiner*—William A Rivera
(74) *Attorney, Agent, or Firm*—Sughrue Mion, PLLC (57) ABSTRACT

A recording medium cartridge and producing method thereof, such that slidability of resin-fabricated members of different materials against one another can be assured even in conditions in which impacts are successively applied. The recording medium cartridge is provided with a recording medium T and a plurality of resin-fabricated components. A mixture C of perfluoropolyethylene and polytetrafluoroethylene is interposed at boundary surfaces at which the resin-fabricated components of different material slide against one another and/or at boundary surfaces at which the resin-fabricated components of different material slide against one another.

11 Claims, 10 Drawing Sheets

RECORDING MEDIUM CARTRIDGE AND FABRICATION METHOD THEREOF

CROSS-REFERENCE TO RELATED APPLICATION

This application claims priority under 35 USC 119 from Japanese Patent Application No. 2006-057490, the disclosure of which is incorporated by reference herein.

BACKGROUND OF THE INVENTION

1. Field of the Invention

The present invention relates to a recording medium cartridge such as a recording tape cartridge or the like which accommodates a single reel within a case and a recording tape such as a magnetic tape or the like which is principally employed as a recording/replaying medium of a computer or the like being wound onto the reel, and to a recording tape cartridge fabrication method.

2. Description of the Related Art

Heretofore, a recording tape cartridge has been known in which a recording tape such as a magnetic tape or the like is wound onto a single reel and the reel is rotatably accommodated in a case made of synthetic resin, and the recording tape cartridge is employed as a data recording/replaying medium of a computer or the like (for data backups). Such a recording tape cartridge commonly has a structure in which braking of the reel at a time of non-use (when the cartridge is not loaded in a drive device) is mechanically implemented only for a rotation direction, while the reel is urged in a rotation axis direction by urging means such as a coil spring or the like.

However, with such a structure, if an impact acts on the recording tape cartridge at a time of non-use, due to mishandling by a user or a droppage or the like, it is easy for the reel to move in the rotation axis direction because of this impact and, in some cases, the rotation direction braking of the reel may be released and creases or the like may be formed in the recording tape. Therefore, in recent years, as illustrated in, for example, Japanese Patent Application Laid Open (JP-A) No. 2005-276416, recording tape cartridges have been proposed which are structured such that, at a time of non-use, the reel is restricted so as not to move in the rotation axis direction, and that restriction is easily released for a time of use.

The recording tape cartridge mentioned above has a structure in which, at a time of non-use, a lock member is inserted in between an upper flange of the reel and a ceiling plate of the case, and thus the reel is restricted so as not to move in the rotation axis direction. That is, the structure is such that, because of the lock member, there is no space for the reel to move in the rotation axis direction. With this structure, at a time of use, a releasing operation is employed in which a brake member which restricts the reel in the rotation direction is raised by a release member of a drive device and the lock member slides in a radial direction of the reel and is withdrawn (i.e., the restriction by the lock member is released).

Accordingly, because the lock member slides against the brake member which restricts the reel in the rotation direction and against the ceiling plate of the case, coefficients of dynamic friction with these members are important. If, for example, polycarbonate (PC) is chosen for the case and polyamide (PA) is chosen for the lock member, in tests by the present applicant, a dynamic friction coefficient of PA against PC is 0.1. With a lock member in which 20% polytetrafluoroethylene (PTFE) is added to polyacetal (POM) to improve sliding, the dynamic friction coefficient is 0.09, and thus sliding characteristics of the PA can be said to be excellent.

Figure 10:
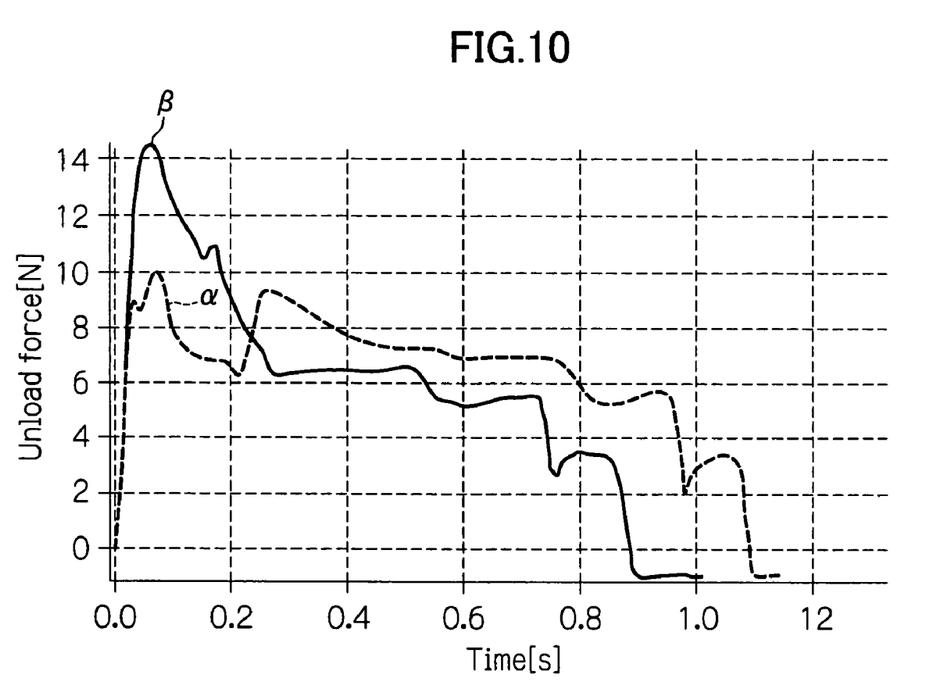
FIG. 10 is a graph showing relationships between time and load when brake members engage with lock members.

However, in actual usage, it has become clear in recent years that it is not sufficient only to consider sliding characteristics of the synthetic resin materials. Specifically, when a recording tape cartridge is loaded into a drive device and the release member of the drive device begins the operation for releasing the brake member, if, for example, the brake member employs PA, a peak in a load which is applied for raising the brake member is, as shown in FIG. 10, of the order of about 10 N (Newtons) after 0.1 seconds (as shown by the broken line α).

However, during transport, during loading into a library device and suchlike, acceleration impacts of around 30 G (G being the acceleration of gravity) are applied to the recording tape cartridge, and with a recording tape cartridge to which such acceleration impacts have been applied, for example, about 20,000 times, a proportional increase in the above-mentioned load is as much as about 40% (becoming about 14 N, as shown by the solid line β). Thus, even when the dynamic friction coefficient is low and sliding characteristics are excellent, in an environment in which acceleration impacts are successively applied, the excellence or non-excellence of sliding characteristics cannot be determined just by the dynamic friction coefficients of the synthetic resin materials.

A coefficient of dynamic friction is measured by performing tests of sliding materials against each other while applying certain loads. However, if an acceleration impact is applied when performing tests are conducted, then if the brake member employs, for example, PA, an impact exceeding 50 G is momentarily applied. With such a load, the lock member acts to move slightly while touching against the case, and a phenomenon similar to the stick-slip phenomenon may occur. This phenomenon is thought to be caused by the PA and PC slightly gouging into one another and producing powder, and this powder then being crushed by the PA.

That is, each time an operation for loading the recording tape cartridge into the drive device or an operation for loading into a library device or the like is repeated, the lock member slides a little in a state in which a pressure of 30 G or more is acting between the lock member and the brake member and/or ceiling member. Thus, the lock member is abraded and powder is produced. Hence, because of this powder, an "adhering phenomenon" occurs, sliding resistance of the lock member increases, and a release force for releasing the reel from the state of times of non-use (a "brake release force") becomes larger. When this problem arises, it may lead to damage to the lock member, a breakdown of the drive device, or the like.

SUMMARY OF THE INVENTION

Accordingly, in consideration of the problems described above, an object of the present invention is to provide a recording medium cartridge and fabrication method thereof such that sliding characteristics between resin-fabricated members of different materials, such as a lock member and a case or a lock member and a brake member, can be assured even in an environment in which impacts are successively applied.

A first aspect of the present invention is a recording medium cartridge including a recording medium and a plurality of components fabricated of resin, wherein a mixture of perfluoropolyethylene and polytetrafluoroethylene is interposed between boundary surfaces at which, of the plurality of resin-fabricated components, resin-fabricated components of different material slide against one another.

According to the aspect described above, slidability between the resin-fabricated components of different material can be improved. Therefore, even in an environment in which, for example, acceleration impacts of 30 G and above are successively applied, sliding characteristics of the resin-fabricated components of different materials against one another can be thoroughly assured.

In the aspect described above, the amount by mass of the mixture may be from 0.01 mg/cm$^2$ to 0.07 mg/cm$^2$.

According to the aspect described above, sliding characteristics between the resin-fabricated components of different material can be excellently preserved.

In an aspect described above, a recess portion configured to accommodate the mixture may be formed at least one of the boundary surfaces.

In an aspect described above, the surface roughness of the boundary surfaces may be set to a maximum height of 5 µm to 50 µm.

According to the aspects described above, the mixture can be excellently preserved, and sliding characteristics between the resin-fabricated components of different material can be preserved.

In an aspect described above, the coefficient of dynamic friction of the boundary surfaces may 0.1 or less.

In an aspect described above, a combination of the resin-fabricated components of different material may be a combination of a component fabricated of a resin selected from materials which include at least one of polycarbonate, acrylonitrile butadiene styrene and polystyrene as a major constituent and a component fabricated of a resin selected from materials which include at least one of polyacetal, polyamide and polyethylene as a major constituent.

An aspect described above may be a structure in which the resin-fabricated components of different material are urged, respectively, in one direction and an opposite direction.

A second aspect of the present invention is a method of producing a recording medium cartridge which includes a recording medium and a plurality of components fabricated of resin, the method including applying a mixture which includes perfluorocarbon, perfluoropolyethylene and polytetrafluoroethylene to at least one of boundary surfaces at which, the plurality of resin-fabricated components of different material will slide against one another.

In the aspect described above, the mixture may include, in percentages by mass, 90%±5% of the perfluorocarbon, 3%±2% of the perfluoropolyethylene and 7%±3% of the polytetrafluoroethylene.

According to the aspect described above, sliding characteristics between resin-fabricated components of different material can be improved. Therefore, even in an environment in which, for example, acceleration impacts of 30 G and above are successively applied, sliding characteristics of the resin-fabricated components of different material against one another can be thoroughly assured.

In the aspect of the recording medium cartridge producing method described above, after the perfluorocarbon has evaporated from the mixture, the amount by mass of the mixture may be from 0.01 mg/cm$^2$ to 0.07 mg/cm$^2$.

According to the aspect described above, sliding characteristics between the resin-fabricated components of different material can be excellently preserved.

In an aspect described above, a combination of the resin-fabricated components of different material may be a combination of a component fabricated of a resin selected from materials which include at least one of polycarbonate, acrylonitrile butadiene styrene and polystyrene as a major constituent and a component fabricated of a resin selected from materials which include at least one of polyacetal, polyamide and polyethylene as a major constituent.

As described above, according to the present invention, a recording medium cartridge and producing method thereof can be provided with which sliding characteristics of resin-fabricated members of different materials against one another can be assured even under conditions in which successive impacts are being applied.

BRIEF DESCRIPTION OF THE DRAWINGS

An exemplary embodiment of the present invention will be described in detail based on the following figures, wherein.

DETAILED DESCRIPTION OF THE INVENTION

Below, an exemplary embodiment of the present invention will be described in detail on the basis of an example shown in the drawings. Note that, for the sake of convenience of explanation, descriptions are given with a recording tape cartridge 10 being employed as an example of a recording medium cartridge. Further, in FIGS. 1A and 1B, a direction of loading of the recording tape cartridge 10 into a drive device is represented by arrow A, and is considered to be a forward direction. Furthermore, arrow B is a rightward direction, and front, rear, left, right, up and down are expressed with reference to these directions. Further still, where radial directions are referred to herebelow, this indicates directions parallel to directions bearing radially outward from an axial (center) line of a reel accommodated in a case.

As shown in FIGS. 1A to 3, the recording tape cartridge 10 includes a substantially rectangular box-form case 12. This case 12 is structured by joining together an upper case 14 and a lower case 16 which are formed of a synthetic resin material including polycarbonate (PC) or acrylonitrile butadiene styrene (ABS) as a major constituent: for example a synthetic resin material in which glass fibers (GF) are mixed into PC. At the upper case 14, a peripheral wall 14B is provided standing along peripheral edges of a ceiling plate 14A, and at the lower case 16, a peripheral wall 16B is provided standing along peripheral edges of a floor plate 16A. The case 12 is formed by, in a state in which the peripheral wall 14B and the peripheral wall 16B are matched with one another, joining the upper case 14 with the lower case 16 by ultrasonic welding, fixing with screws or the like.

A single reel 30 is rotatably accommodated inside the case 12. A recording tape T, such as a magnetic tape which serves as an information recording/replaying medium or the like, is wound onto the reel 30. An opening 20 is formed in a front-right corner portion of the case 12. The opening 20 is for drawing-out of the recording tape T which has been wound onto the reel 30 to the outside. A leader block 22 is fixed to an end portion of the recording tape T. That is, a resilient pin 26 is fitted into a recess portion 24 of the leader block 22 in a state in which the distal end of the magnetic tape T is gripped in the recess portion 24.

At times of non-use of the recording tape cartridge 10, the leader block 22 engages with peripheral edge portions of the opening 20 and closes off the opening 20. At times of use of the recording tape cartridge 10, an engaging portion 28 formed at a distal end of the leader block 22 is engaged by a drawing-out member provided at a drive device (not shown), and the leader block 22 is drawn out from the opening 20. Note that a leader member to be attached to the end portion of the recording tape T is not limited to the leader block 22, and could be, for example, a leader tape or leader pin (neither of which is illustrated) or the like which is provided separately from a door which closes off the opening 20.

The reel 30 is formed of a synthetic resin material, and is structured by integrally forming a reel hub 32 and an upper flange 34, and attaching a lower flange 36 to a lower end portion of the reel hub 32 by ultrasonic welding or the like. The reel hub 32 has the form of a circular tube with a base, and the upper flange 34 is provided at an upper end portion of the reel hub 32. Accordingly, the reel hub 32 and the lower flange 36 are formed using synthetic resin materials which are compatible with one another and can easily be welded by ultrasonic waves or the like. A spacing between the upper flange 34 and the lower flange 36 is set to be substantially equal to a breadth of the recording tape T, such that a breadth direction position of the recording tape T that is wound round the reel hub 32 is controlled.

Figure 2:
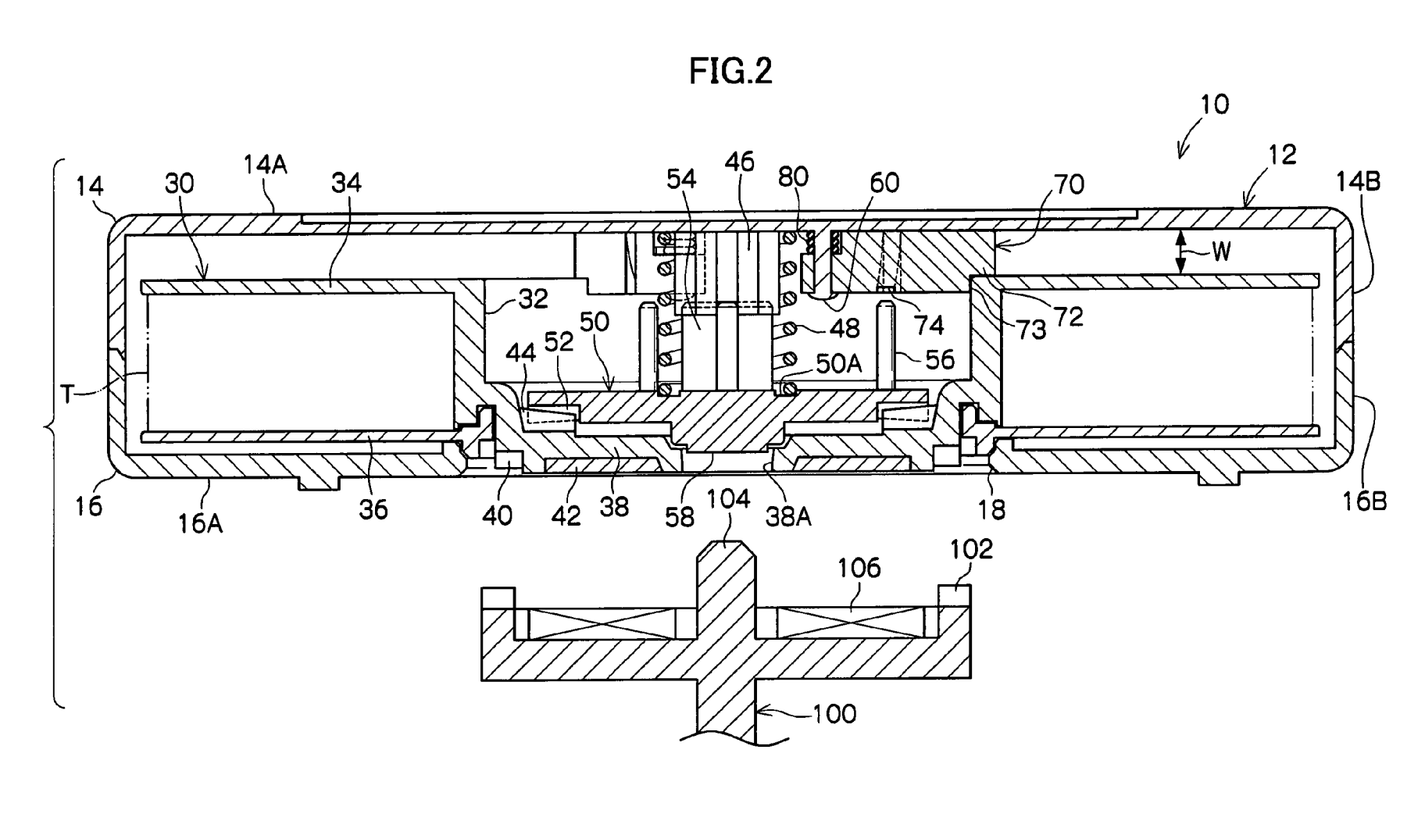
FIG. 2 is a schematic side sectional view of the recording tape cartridge before a rotation shaft rises.
Figure 3:
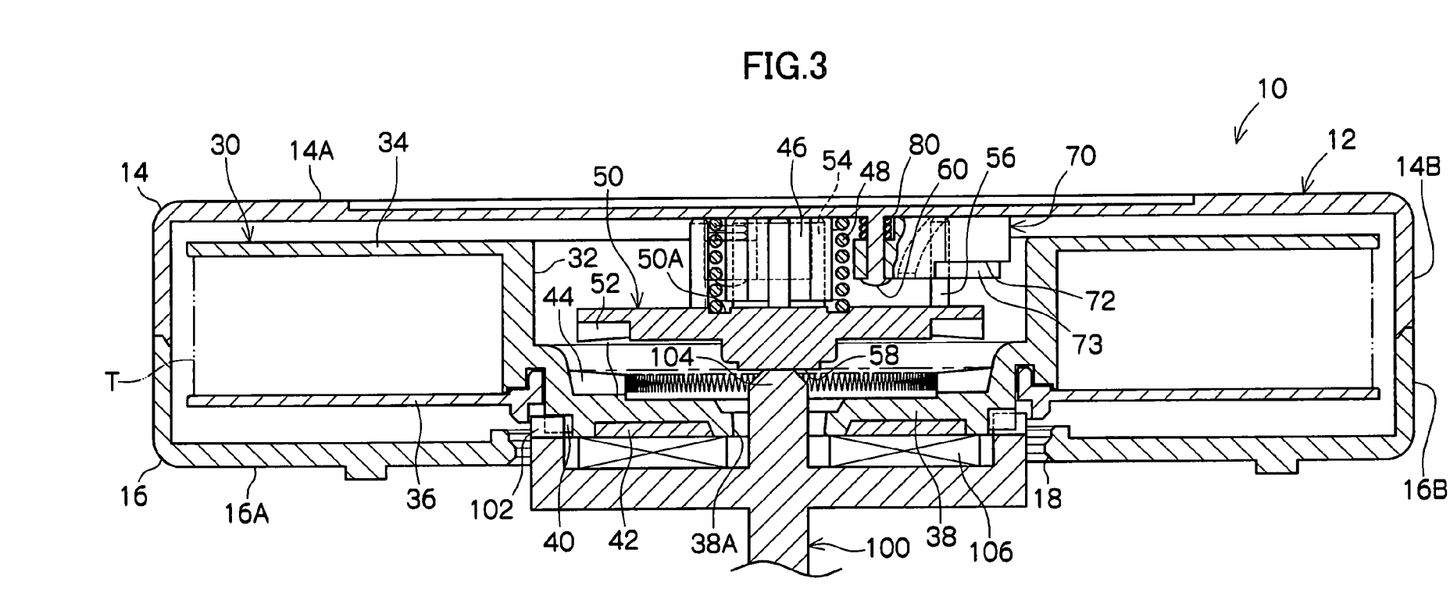
FIG. 3 is a schematic side sectional view of the recording tape cartridge after the rotation shaft has risen.

Further, as shown in FIGS. 2 and 3, a base wall 38 is provided at the lower flange 36 side of the reel hub 32. A through-hole 38A is formed through an axial (central) portion of this base wall 38, and a reel gear 40 is formed in an annular shape at a lower face side of the base wall 38. The reel 30 is pushed toward the lower case 16 by urging force of a compression coil spring 48, and thus the reel gear 40 is exposed through a circular gear aperture 18, which is formed substantially at the middle of the lower case 16. A drive gear 102 is provided at a rotation shaft 100 at a drive device. The reel 30 meshes with the drive gear 102, such that rotation force will be transmitted to the reel 30.

An annular reel plate 42 formed of a magnetic material is integrally fixed at a radial direction inner side of the reel gear 40, by insert-molding or the like. In a state in which the drive gear 102 and the reel gear 40 are fully meshed, this reel plate 42 is attracted and adhered by magnetic force of an annular magnet 106, which is provided between the drive gear 102 and a release protrusion 104, which will be described later. Thus, the reel plate 42 prevents mis-centering (offsetting of axes) of the reel 30 and the rotation shaft 100, and enables maintenance of the reel gear 40 and the drive gear 102 in the meshed state. With this structure, when the rotation shaft 100 rotates about its own axis, the reel 30 rotates integrally therewith inside the case 12.

Figure 4:
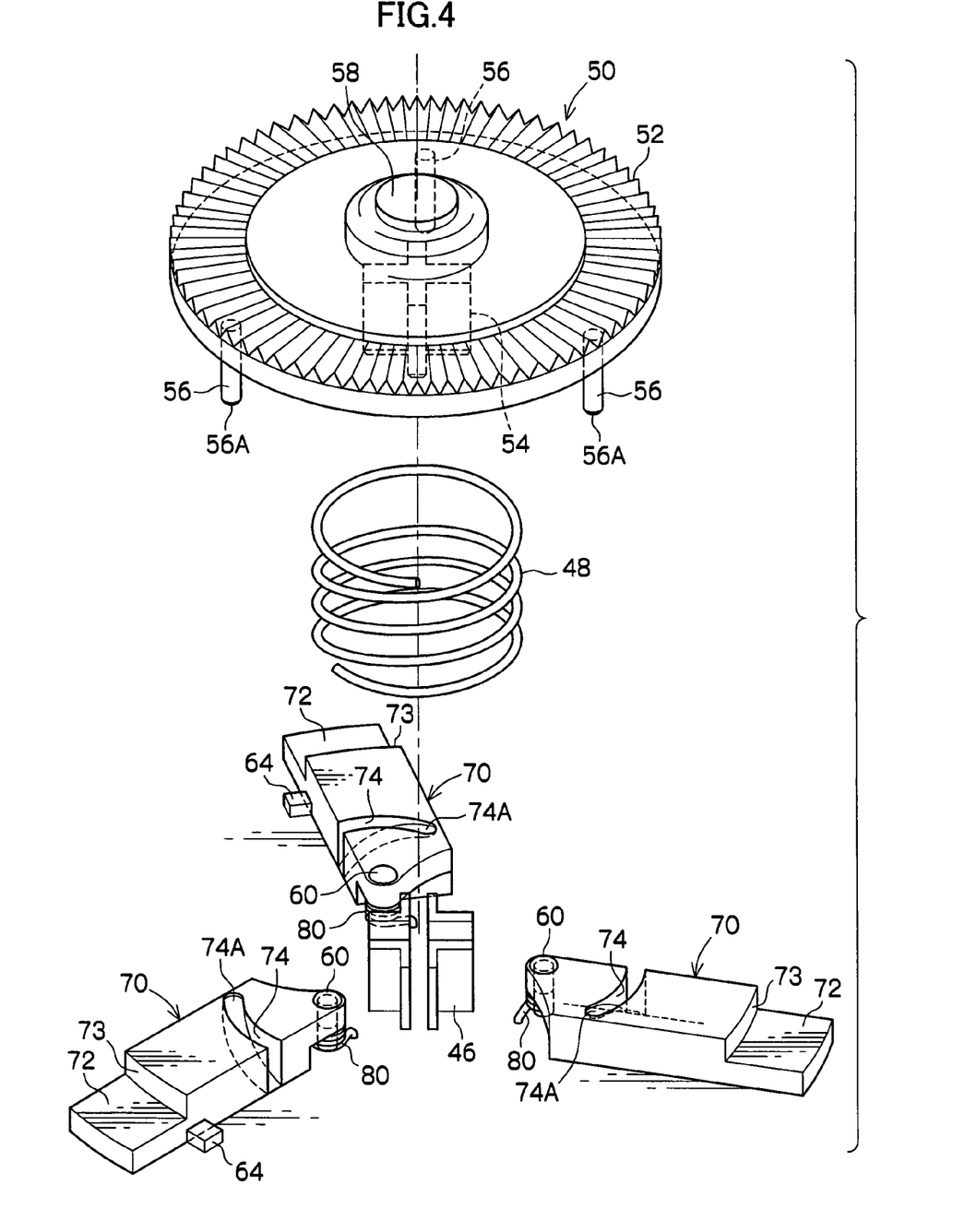
FIG. 4 is a schematic exploded perspective view showing a relationship between lock members and a brake member.

An engaging gear 44 is formed in an annular shape at an upper-face side of the base wall 38 of the reel hub 32. The engaging gear 44 can mesh with a braking gear 52 of a brake member 50. As shown in FIG. 4, this brake member 50 is formed in a circular plate shape which is accommodated to be vertically movable inside the reel hub 32 (i.e., movable in the axial direction of the reel 30), and is formed of, for example, a synthetic resin material of which polycarbonate (PC), acrylonitrile butadiene styrene (ABS) or polystyrene (PS) is a major constituent.

As shown in FIG. 4, substantially at the middle of an inner face of the ceiling plate 14A of the upper case 14, four rotation restriction wall portions 46 are formed with substantial 'L' shapes in bottom view. The rotation restriction wall portions 46 protrude by a predetermined height, in a state in which corner portions (right angle portions) thereof are opposingly spaced by a predetermined spacing. At the middle of an upper face of the brake member 50, an engaging wall portion 54 with a substantial '+' shape in plan view is provided protruding by a predetermined height, and is inserted between the rotation restriction wall portions 46. Also at the upper face of the brake member 50, at the outer side of the engaging wall portion 54, long, thin circular rod-form engaging protrusions 56 are plurally (three in the illustrated case) provided to protrude by a predetermined height, with equal spacings.

These engaging protrusions 56 are respectively insertable and abuttable into cam groove portions 74 of a plurality (three in the illustrated case) of lock members 70, which will be described later. As shown in FIGS. 2 and 3, at the upper face of the brake member 50, a flat surface 50A is formed in an annular shape at the outer side of the engaging wall portion 54 and the inner side of the engaging protrusions 56. When the recording tape cartridge 10 (the case 12) has been assembled, the compression coil spring 48 which serves as an urging member abuts against the flat surface 50A. An upper end of the compression coil spring 48 abuts against the inner face of the ceiling plate 14A, at the outer side of the rotation restriction wall portions 46. Thus, the brake member 50 is constantly urged downward.

Further, at the middle of a lower face of the brake member 50, a substantially circular column-form operation protrusion 58 is protrudingly provided, which is insertable into the through-hole 38A. The operation protrusion 58 is abuttable against the release protrusion 104 which is protrudingly provided at the central portion of the rotation shaft 100 of the drive device (see FIGS. 2 and 3). Here, the operation protrusion 58 is provided protruding to a height such that, at a time of non-use (when the recording tape cartridge 10 is not loaded into a drive device), the operation protrusion 58 does not protrude downward from the through-hole 38A (from the base wall 38), as shown in FIG. 2 (i.e., a height so as to be disposed inside the through-hole 38A). Therefore, the brake member 50 will not inadvertently be moved upward.

Further, as shown in FIGS. 4 to 9, the lock members 70 are provided at the recording tape cartridge 10 for restricting such that the reel 30 does not inadvertently move in a rotation axis direction (a vertical direction) at times of non-use. The lock members 70, in order to have excellent sliding characteristics against the ceiling plate 14A of the upper case 14 and the engaging protrusions 56 of the brake member 50, are formed of a synthetic resin material including polyacetal (POM), polyamide (PA) or polyethylene (PE) as a major constituent: for example, a synthetic resin material in which polytetrafluoroethylene (PTFE) is mixed into POM, a synthetic resin material in which molybdenum (Mo) is mixed into PA, or a synthetic resin material in which PE is mixed into POM.

Each lock member 70 includes an engaging portion 72 at a radial direction outer side (see FIG. 2), which engages with an upper edge portion of the reel hub 32 from the side of an inner peripheral face of the reel hub 32, is interposed between the inner face of the ceiling plate 14A and an upper face of the upper flange 34, and blocks movement of the reel 30 in the rotation axis direction (the vertical direction). An end portion of the lock member 70 at an opposite side thereof from the engaging portion 72 (i.e., a radial direction inner side) is pivotingly supported at the inner face of the ceiling plate 14A, and the lock member 70 is structured so as to be rotatable to a position of engagement with the reel 30 and a withdrawal position which permits movement of the reel 30 in the rotation axis direction (the vertical direction).

Figure 6:
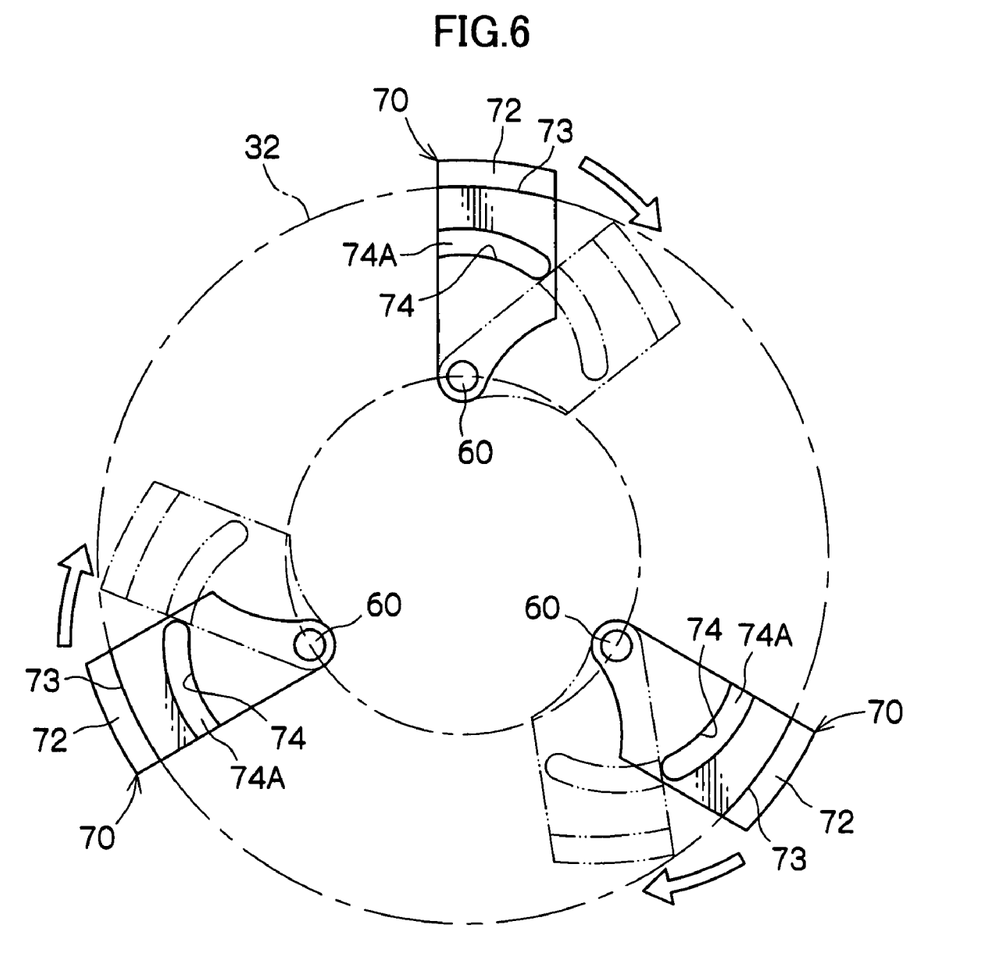
FIG. 6 is a schematic plan view showing the operation of rotation of the lock members.

That is, at the inner face of the ceiling plate 14A of the upper case 14, mounting pins 60 are plurally (three in the illustrated case) provided protruding, with equal spacings, from a circular periphery that is concentric with an axial portion of the reel hub 32 (see FIG. 6). At each pin 60, a coil portion 82 of a torsion spring 80, which urges the lock member 70 in one direction, and a through-hole 71, which is formed in one end portion of the lock member 70, are fitted over the pin 60 in that order (see FIG. 7). After these have been fitted on, a distal end of the pin 60 is calked (crushed), and thus the lock member 70 is rotatably mounted, being blocked from falling off from the pin 60.

Figure 5A:
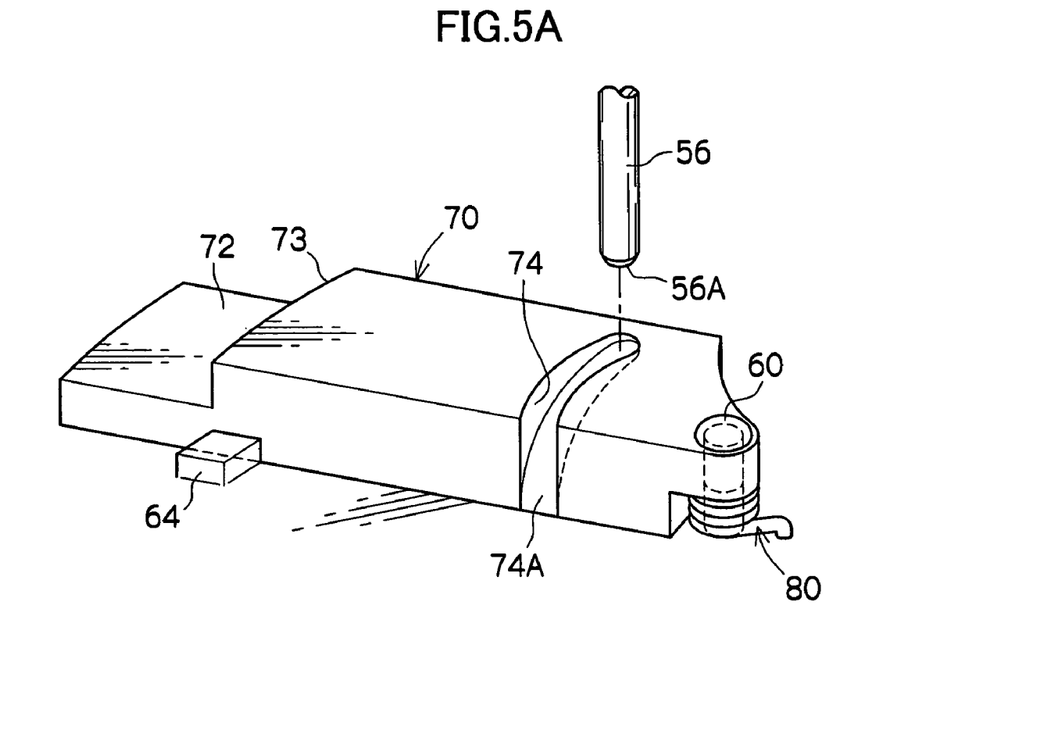
FIGS. 5A and 5B are schematic perspective views showing an operation of rotation of the lock members.
Figure 5B:
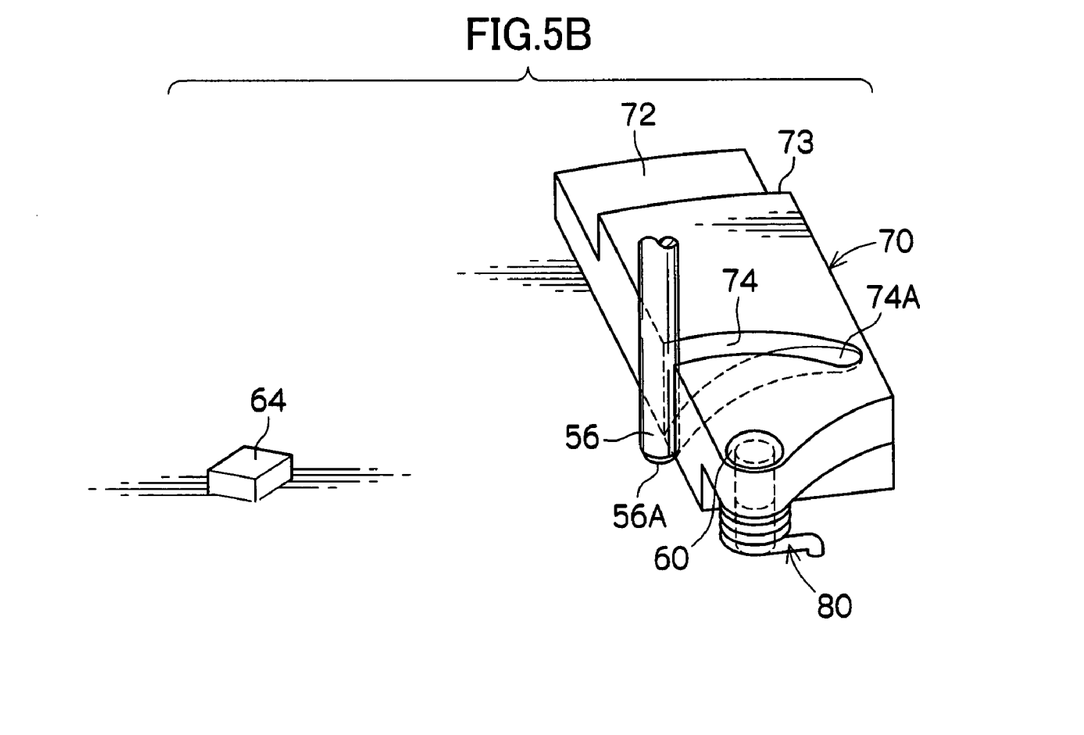
Figure 7:
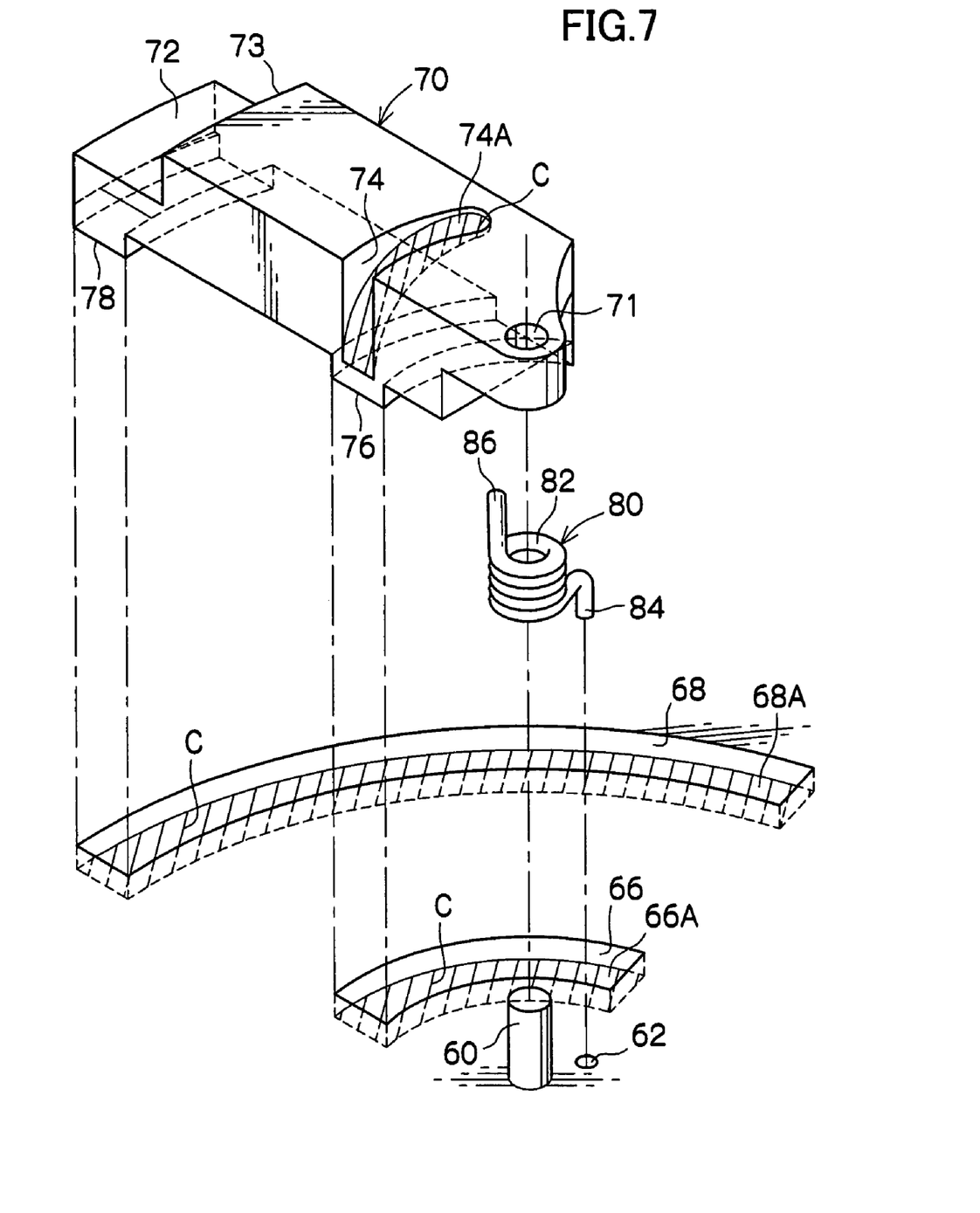
FIG. 7 is a schematic exploded perspective view showing a mounting structure of a lock member to an inner face of a ceiling plate of an upper case.
Figure 9:
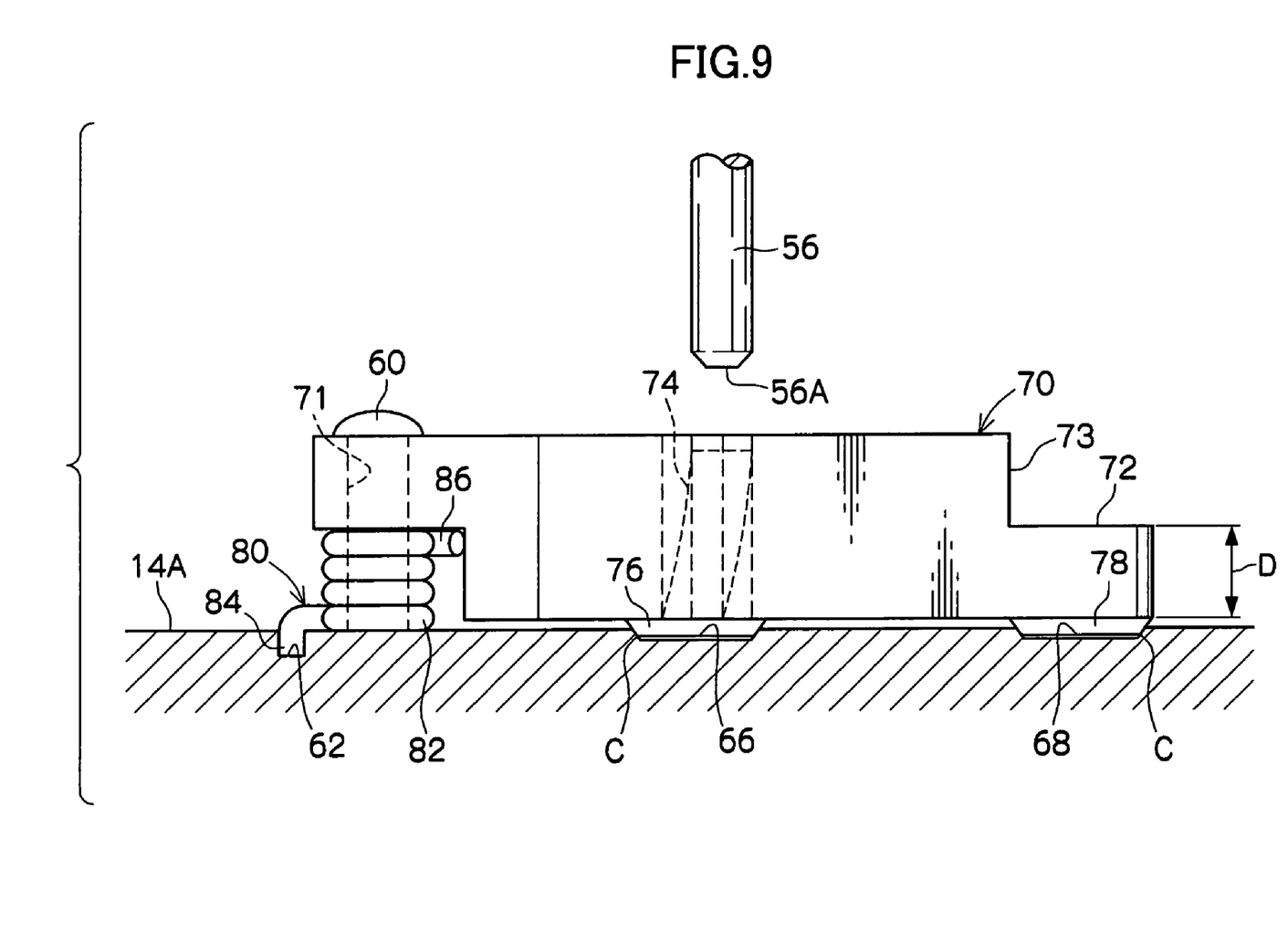
FIG. 9 is a schematic side sectional view showing the lock member, which has been mounted to the inner face of the ceiling plate of the upper case.

Further, as shown in FIGS. 7 and 9, at predetermined positions of the inner face of the ceiling plate 14A, anchoring holes 62 are formed. One end portions 84 of the torsion springs 80 are fixed by being inserted into the anchoring holes 62, and other end portions 86 of the torsion spring 80 are anchored at the lock members 70. Thus, the lock members 70 are constantly urged toward the engaging positions (i.e., in directions opposite to the directions of the arrows shown in FIG. 6, which are directions intersecting the direction of urging of the brake member 50). Further, as shown in FIGS. 4 and 5, stoppers 64 are protrudingly provided at the inner face of the ceiling plate 14A, with heights so as not to interfere with the upper face of the upper flange 34 of the reel 30. The stoppers 64 block rotation of the lock members 70 by the urging forces of the torsion springs 80 beyond predetermined positions.

At a substantially central portion of each lock member 70, the cam groove portion 74 is formed, which includes an inclined surface 74A which is angled downward in a direction toward the engaging position (i.e., toward the stopper 64). The engaging protrusion 56 of the brake member 50 is formed to be capable of advancing into the cam groove portion 74 and abutting thereagainst. Therefore, as shown in FIGS. 5A and 5B, as the brake member 50 rises, the engaging protrusion 56 advances into the cam groove portion 74, and a distal end surface 56A of the engaging protrusion 56 presses against a head portion of the inclined surface 74A in the cam groove portion 74. Hence, the lock member 70 turns in the direction of the arrow shown in FIG. 6 (toward the withdrawal position), in opposition to the urging force of the torsion spring 80, and the engaging portion 72 withdraws from the upper edge portion of the reel hub 32.

Thus, the lock member 70 is a structure which can turn about the pin 60 from the engaging position defined by the stopper 64 to the withdrawal position at which the lock member 70 is withdrawn from the upper edge portion of the reel hub 32. The inclined surface 74A of the cam groove portion 74 and the distal end surface 56A of the engaging protrusion 56 are "boundary surfaces" of the present invention, and a dynamic friction coefficient μ between the inclined surface 74A and the distal end surface 56A, which are formed of the synthetic resin materials mentioned earlier, is not more than 0.1.

A thickness D of the engaging portion 72 of the lock member 70 (see FIG. 9) is formed to be substantially the same as a separation W in the case 12 between the upper face of the upper flange 34 and the inner face of the ceiling plate 14A when the reel 30 is disposed at a lowermost position (see FIG. 2). An engaging surface 73 is formed at a radial direction inner side relative to the engaging portion 72. The engaging surface 73 is formed as a circular arc face which engages with the inner peripheral face of the reel hub 32, and abuts against the inner peripheral face of the reel hub 32 (see FIG. 6). Therefore, the lock members 70 are structures of which, when the recording tape cartridge 10 is being assembled (when the upper case 14 is being covered with the lower case 16), the engaging portions 72 and the engaging surfaces 73 easily engage with the upper edge portions of the reel hub 32 in accordance with that operation.

Figure 8A:
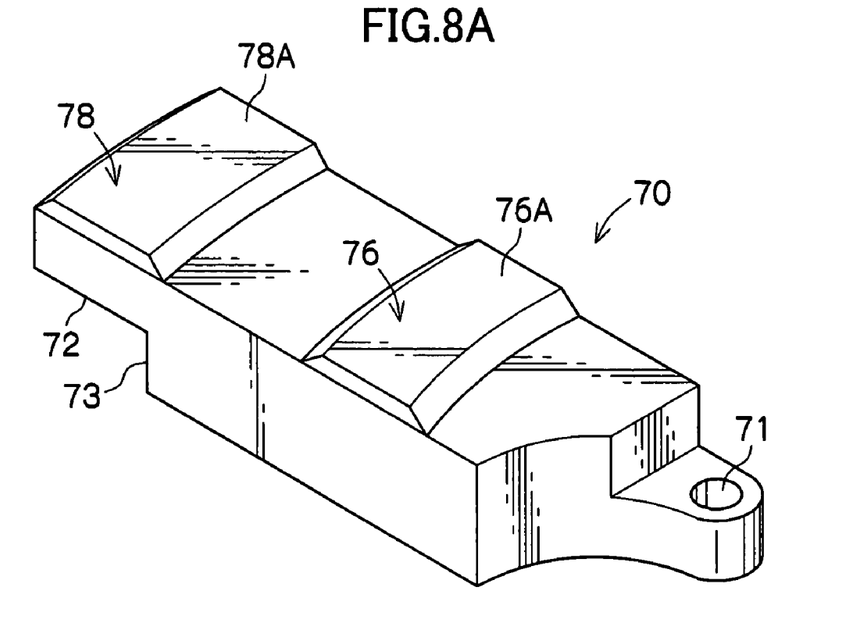
FIG. 8A is a schematic perspective view of the lock member showing a bottom face side.
Figure 8B:
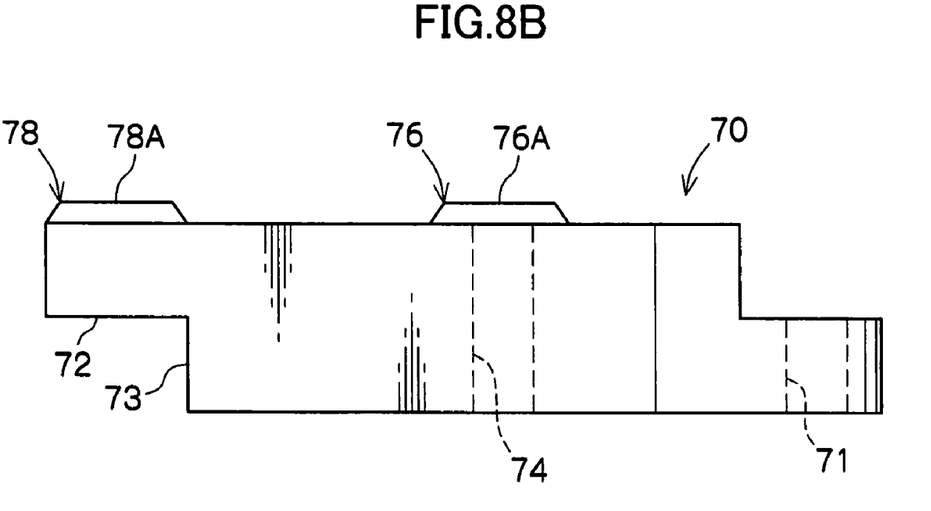
FIG. 8B is a side view of the lock member.

As shown in FIGS. 7 and 8, at a upper face of each lock member 70, which opposes the inner face of the ceiling plate 14A, two protrusion portions 76 and 78, which are separated by a predetermined spacing, are provided protruding to predetermined heights. Two recess portions 66 and 68 with predetermined depths are formed at the inner face of the ceiling plate 14A. The protrusion portions 76 and 78 are inserted into the recess portions 66 and 68, respectively, to be capable of sliding. The protrusion portions 76 and 78 have lengths substantially the same as the breadth of the lock member 70, and slide so as to be guided in the recess portions 66 and 68. Correspondingly, the recess portions 66 and 68 are formed in circular arc forms with lengths corresponding to the range of turning of the lock member 70.

The lock member 70 is a structure of which only surfaces 76A and 78A of the protrusion portions 76 and 78 serve as sliding surfaces, which slide against inner faces 66A and 68A of the recess portions 66 and 68, and the upper surface of the lock member 70 apart from the protrusion portions 76 and 78 does not touch the inner face of the ceiling plate 14A (see FIG. 9). Therefore, in comparison with a case in which the whole of a upper face of the lock member 70 would be a sliding surface, a contact surface area between the lock member 70 and the ceiling plate 14A can be made smaller, and it is possible to reduce a sliding resistance of the lock member 70.

Here, the surfaces (sliding faces) 76A and 78A of the protrusion portions 76 and 78 and the inner faces 66A and 68A of the recess portions 66 and 68 are "boundary surfaces" of the present invention, and a dynamic friction coefficient μ between the inner faces 66A and 68A and the surfaces (sliding faces) 76A and 78A, which are formed of the synthetic resin materials mentioned earlier, is not more than 0.1. In addition, a lubricant is applied to the inner faces 66A and 68A of the recess portions 66 and 68 in order to improve sliding characteristics against the surfaces 76A and 78A of the protrusion portions 76 and 78.

The lubricant is a mixed liquid including perfluorocarbon (PFC), perfluoropolyethylene (PFPE) and polytetrafluoroethylene (PTFE). After application, the PCF evaporates and disappears, and a mixture C of PFPE and PTFE is left at each of the inner faces 66A and 68A of the recess portions 66 and 68. Herein, depths of the recess portions 66 and 68 are set to depths capable of assuring a thickness of the mixture C of PFPE and PTFE (a mixed liquid coating thickness) of at least 5 μm, and an upper limit of the depths is determined in accordance with a plate thickness of the ceiling plate 14A (to an extent such that stiffness of the ceiling plate 14A will not be impaired).

Proportions of the mixed liquid at the time of application are preferably, in percentages by mass, 90%±5% of PFC, 3%±2% of PFPE and 7%±3% of PTFE. Coating is desirably such that an amount by mass of the mixture C of PFPE and PTFE, after the PFC has evaporated, is 0.01 mg/cm$^2$ to 0.07 mg/cm$^2$. If this is less than 0.01 mg/cm$^2$, desired sliding characteristics will not be obtained, and if this is greater than 0.07 mg/cm$^2$, the mixture C may leak out from the recess portions 66 and 68.

Surface roughnesses of the inner faces 66A and 68A of the recess portions 66 and 68 preferably have a maximum height (Rmax) of 5 μm to 50 μm. If Rmax is less than 5 μm, it will be hard to retain the mixture C of PFPE and PTFE. On the other hand, if Rmax is greater than 50 μm, the inner faces 66A and 68A will grind back against the protrusion portions 76 and 78 in accordance with sliding of the protrusion portions 76 and 78, causing powder to be formed. The mixed liquid including PFC, PFPE and PTFE may be applied to the surfaces 76A and 78A of the protrusion portions 76 and 78 rather than the inner faces 66A and 68A of the recess portions 66 and 68. It is also desirable to similarly coat the inclined surfaces 74A of the cam groove portions 74 or the distal end surfaces 56A of the engaging protrusions 56 with the mixed liquid which includes PFC, PFPE and PTFE.

Next, for the recording tape cartridge 10 with the structure as described above, operation will be described. At times of non-use (when not loaded at a drive device), the opening 20 of the recording tape cartridge 10 is closed off by the leader block 22. Further, the reel 30 is urged downward by the compression coil spring 48 via the brake member 50. That is, because of the urging from the compression coil spring 48, the braking gear 52 of the brake member 50 firmly meshes with the engaging gear 44 in the reel hub 32, and the engaging wall portion 54 is inserted between the rotation restriction wall portions 46. Thus, inadvertent rotation of the reel 30 is blocked (see FIG. 2).

The lock members 70 are urged so as to turn in the directions towards the engaging positions by the urging forces of the torsion springs 80, and abut against the stoppers 64. Thus, in this state, the engaging portions 72 and the engaging surfaces 73 engage with the upper edge portions of the reel hub 32. That is, the engaging surfaces 73 abut against the inner peripheral face of the reel hub 32 and the engaging portions 72 are interposed between the upper face of the upper flange 34 and the inner face of the ceiling plate 14A.

Herein, the thickness D of the engaging portions 72 of the lock members 70 is formed to be substantially the same as the separation W within the case 12 between the upper face of the upper flange 34 and the inner face of the ceiling plate 14A when the reel 30 is disposed at the lowermost position thereof (see FIG. 2). Therefore, inadvertent raising of the reel 30 is blocked by the lock members 70. That is, even if an impact is applied to the recording tape cartridge 10 by a fall or the like, rotation of the reel 30 is blocked by the brake member 50 and movement of the reel 30 in the rotation axis direction (vertical direction) is blocked by the lock members 70.

When data is to be recorded at the recording tape T of the recording tape cartridge 10, or data that has been recorded at the recording tape T of the recording tape cartridge 10 is to be replayed, the recording tape cartridge 10 is loaded into a drive device (not shown). That is, the recording tape cartridge 10 is inserted, in the direction of arrow A from a front wall 12A side thereof, at a loading aperture (not shown) of the drive device.

When the recording tape cartridge 10 is loaded (inserted) into the drive device, the recording tape cartridge 10 descends by a predetermined height, or the rotation shaft 100 rises, and the release protrusion 104 enters through the through-hole 38A. Thus, the release protrusion 104 pushes the operation protrusion 58 upward, and the meshing between the braking gear 52 of the brake member 50 and the engaging gear 44 at the inside of the reel hub 32 is released. Hence, the release protrusion 104 of the rotation shaft 100, via the operation protrusion 58, positions the reel 30 in the height direction, and the reel plate 42 is attracted and adhered to the annular magnet 106. Thus, the recording tape cartridge 10 (the reel 30) is accurately positioned in the drive device, and in this state, the drive gear 102 meshes with the reel gear 40 (see FIG. 3).

Further, when the release protrusion 104 pushes the operation protrusion 58 upward, the brake member 50 rises in opposition to the urging force of the compression coil spring 48, and the distal end surfaces 56A of the engaging protrusions 56 press against the head portions of the inclined surfaces 74A in the cam groove portions 74 of the lock members 70. Accordingly, the lock members 70 are turned about the pins 60 toward the withdrawal positions, in opposition to the urging forces of the torsion springs 80. Thus, the engaging surfaces 73 are moved away from the inner peripheral face of the reel hub 32 and the engaging portions 72 withdraw from between the upper face of the upper flange 34 and the inner face of the ceiling plate 14A, and are accommodated within the reel hub 32 (see FIG. 6). Thus, the lock members 70 are retained in an unlocked state, the reel 30 can rise within the case 12 by a predetermined height, and when disposed at the predetermined height, the reel 30 can be driven to rotate.

At this time, because the lubricant has been applied, each engaging protrusion 56 can slide smoothly on the inclined surface 74A of the cam groove portion 74. That is, at the inclined surface 74A of the cam groove portion 74, the mixed liquid including PFC, PFPE and PTFE has been coated to serve as the lubricant and, without the PFC which has evaporated and disappeared, the mixture C of PFPE and PTFE is left. Therefore, sliding characteristics of the distal end surfaces 56A of the engaging protrusions 56 against the inclined surfaces 74A of the cam groove portions 74 are improved.

Furthermore, at this time, because the lubricant has also been applied to each of the inner faces 66A and 68A of the recess portions 66 and 68 formed at the inner face of the ceiling plate 14A, the protrusion portions 76 and 78 of the lock member 70 can slide smoothly. That is, a sliding surface of the lock member 70 against the inner face of the ceiling plate 14A is only the surfaces 76A and 78A of the protrusion portions 76 and 78, and the recess portions 66 and 68 into which the protrusion portions 76 and 78 are inserted for sliding are formed at the inner face of the ceiling plate 14A. Further, the coating liquid including PFC, PFPE and PTFE which serves as the lubricant has been coated onto the inner faces 66A and 68A of the recess portions 66 and 68 and, without the PFC which has evaporated and disappeared, the mixture C of PFPE and PTFE is left. Therefore, sliding characteristics of the surfaces 76A and 78A of the protrusion portions 76 and 78 against the inner faces 66A and 68A of the recess portions 66 and 68 are improved.

In this manner, slidability between the brake member 50 (i.e., the engaging protrusions 56) and the lock members 70 (i.e., the cam groove portions 74) and between the lock members 70 (i.e., the protrusion portions 76 and 78) and the ceiling plate 14A (i.e., the recess portions 66 and 68) is improved. Thus, even in an environment in which acceleration impacts are continually applied, such as in an operation of loading into a drive device, an operation of loading into a library device and suchlike, it is possible to avoid degradation of these sliding characteristics, and a situation such that a brake release force is increased does not arise. That is, by forming with such a structure, a recording tape cartridge 10 which can endure usage for tens of thousands of cycles is obtained, and occurrences of breakages of the lock members 70, breakdowns of drive devices and suchlike can be prevented.

Meanwhile, a drawing-out member (not shown) of the drive device engages with the engaging portion 28 of the leader block 22 (see FIGS. 1A and 1B) and draws the leader block 22 out from the case 12. At this time, because the recording tape cartridge 10 is accurately positioned in the drive device, the drawing-out member can reliably engage with the engaging portion 28 of the leader block 22. Hence, the leader block 22 that has been drawn out from the recording tape cartridge 10 is accommodated in a fitting portion formed in a hub (not shown) of a winding reel of the drive device.

When the leader block 22 has been accommodated in the fitting portion of the winding reel, the reel 30 is driven to rotate synchronously with the winding reel by the rotation shaft 100. Thus, the recording tape T is wound round the winding reel while being sequentially drawn out from inside the recording tape cartridge 10. Recording of data to the recording tape T and/or replaying of data which has been recorded to the recording tape T is carried out by a recording/replaying head (not shown), which is provided at a predetermined tape path.

Figure 1A:
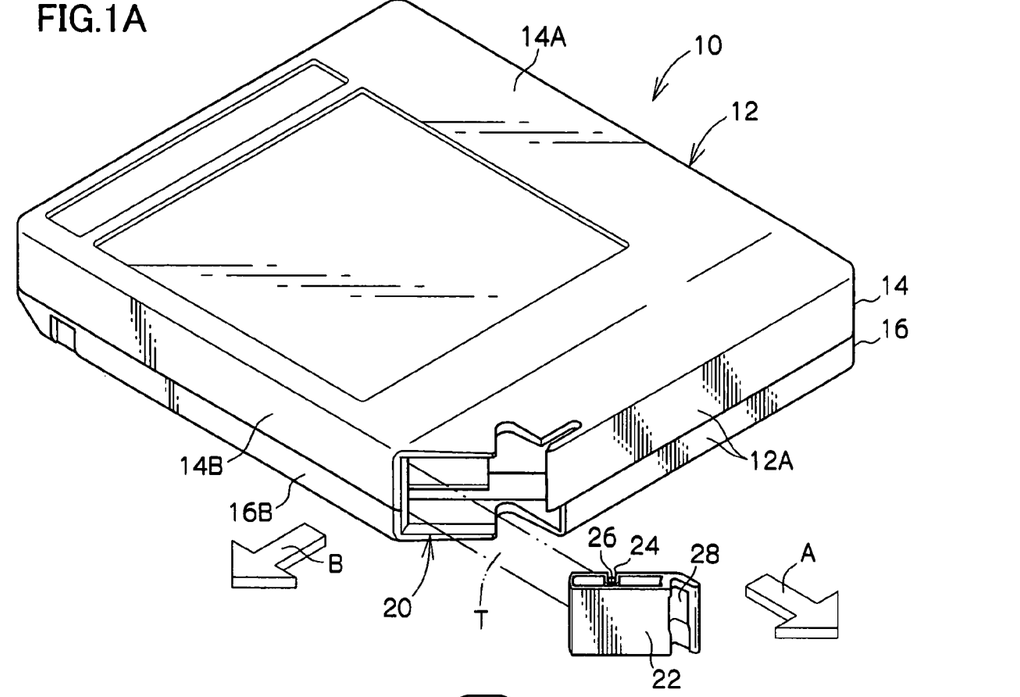
FIGS. 1A and 1B are schematic perspective views of a recording tape cartridge.
Figure 1B:
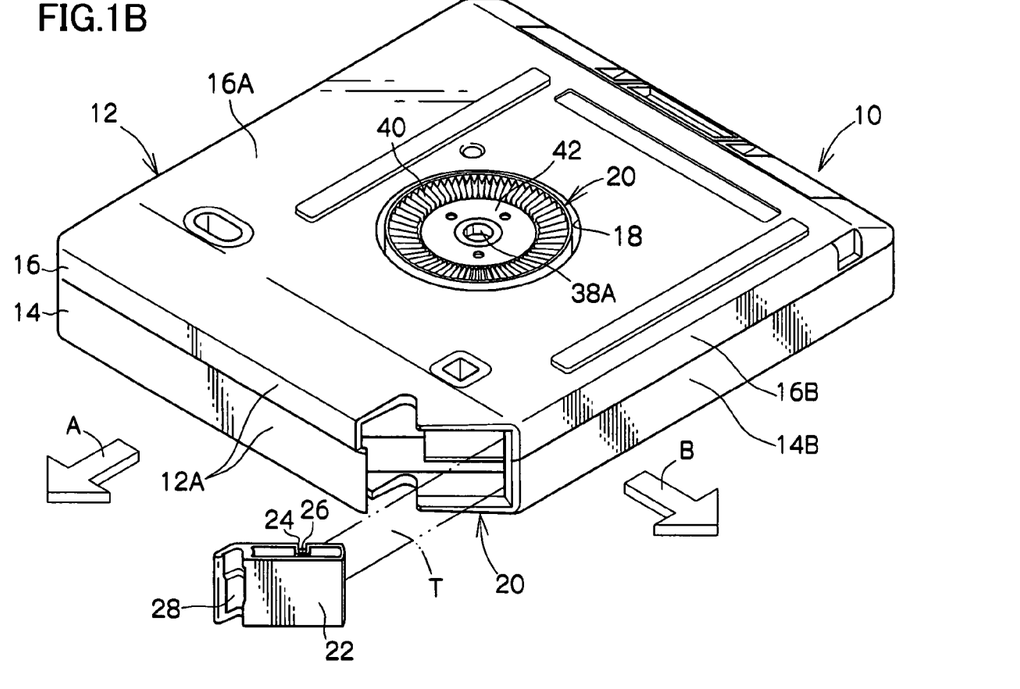

Subsequently, when the recording tape cartridge 10 is to be ejected from the drive device, first the recording tape T is wound back to the reel 30, and the leader block 22 closes off the opening 20 (see FIGS. 1A and 1B). Then, the recording tape cartridge 10 ascends or the rotation shaft 100 descends, and accordingly the reel 30 starts to descend due to the urging force of the compression coil spring 48, and the brake member 50 starts to descend.

Correspondingly, each lock member 70 starts to turn about the pin 60 toward the engaging position thereof, due to the urging force of the torsion spring 80. That is, the distal end surface 56A of the engaging protrusion 56 starts to slide toward the head portion of the inclined surface 74A in the cam groove portion 74. Then, while the rotation shaft 100 descends, the reel plate 42 moves away from the annular magnet 106, and the meshing of the drive gear 102 with the reel gear 40 starts to release. At a time at which an amount of meshing between the reel gear 40 and the drive gear 102 has fallen to somewhere about half of a tooth height, the engaging portions 72 of the lock members 70 start to interpose between the upper face of the upper flange 34 and the inner face of the ceiling plate 14A.

That is, before the meshing of the drive gear 102 with the reel gear 40 is completely released (i.e., while the reel 30 is still supported by the rotation shaft 100), the lock members 70 interpose between the upper face of the upper flange 34 and the inner face of the ceiling plate 14A, and retain the reel 30 between the lock members 70 and the lower case 16, blocking rising thereof. Therefore, even if the recording tape cartridge 10 is ejected from the drive device in a vertical orientation, because the reel 30 is gripped by the lock members 70 to be unable to rise, the reel 30 will not displace vertically downward, locking by the lock members 70 is reliably carried out, and mispositioning (off-centering) relative to the case 12 is prevented.

Thereafter, when the rotation shaft 100 descends further and the meshing of the drive gear 102 with the reel gear 40 is completely released, each engaging portion 72 and engaging surface 73 engages with an upper edge portion of the reel hub 32. That is, due to the urging force of the torsion spring 80, the lock member 70 turns to the engaging position at which the lock member 70 abuts against the stopper 64, the engaging surface 73 abuts against the inner peripheral face of the reel hub 32, and the engaging portion 72 is completely interposed between the upper face of the upper flange 34 and the inner face of the ceiling plate 14A.

Then, when the distal end surface 56A of the engaging protrusion 56 moves away from the inclined surface 74A of the cam groove portion 74 and the release protrusion 104 moves away from the operation protrusion 58, the brake member 50 descends to a lowermost position thereof due to the urging force of the compression coil spring 48, and the braking gear 52 firmly meshes with the engaging gear 44. Thus, the state in which inadvertent rotations and rotation axis direction movements of the reel 30 are blocked is resumed. Hence, when the rotation shaft 100 has disengaged from the gear aperture 18, the recording tape cartridge 10 is ejected from the loading aperture.

As described hereabove, according to the recording tape cartridge 10 relating to the present exemplary embodiment, sliding characteristics of resin-fabricated components with different materials, such as the lock member 70 and the brake member 50 or the lock member 70 and the ceiling plate 14A, against one another can be improved. Accordingly, even in conditions in which, for example, acceleration impacts of 30 G or above are successively applied, the sliding characteristics can be thoroughly assured and maintained. Now, as a lubricant which provides a similar effect, a mixture in which PTFE is added to grease would be available. However, because grease is always maintained in a wet condition, there would be concern about the grease being spattered when strong impacts are applied. In contrast, with the lubricant used in the present invention, a wet-state substance (PFC) vaporizes after coating, and therefore there is no reason to worry about spattering.

Furthermore, the present exemplary embodiment has a structure in which the lock member 70 is caused to slide by engagement with the brake member 50. However a structure for causing the lock member 70 to turn is not limited to this form. For example, structures are possible in which a switching member or the like, for switching the lock member 70 between an ascension-locking position (a position which blocks rotation axis direction movement of the reel 30) and an ascension-permitting position (a position which allows rotation axis direction movement of the reel 30), is provided separately from the brake member 50. In such a case, a structure in which the switching member or the like operates interlockingly with the brake member 50 is preferable. Furthermore, the recording tape cartridge 10 is merely an example of a recording medium cartridge relating to the present invention, and obviously suitable design modifications are possible within a scope not departing from the spirit of the present invention.

What is claimed is:

1. A recording medium cartridge comprising a recording medium and a plurality of components fabricated of resin, wherein a mixture including perfluoropolyethylene and polytetrafluoroethylene is interposed between boundary surfaces at which, of the plurality of resin-fabricated components, resin-fabricated components of different material slide against one another.

2. The recording medium cartridge of claim 1, wherein the amount by mass of the mixture is from 0.01 mg/cm$^2$ to 0.07 mg/cm$^2$.

3. The recording medium cartridge of claim 1, wherein a recess portion configured to accommodate the mixture is formed at least one of the boundary surfaces.

4. The recording medium cartridge of claim 1, wherein the surface roughness of the boundary surfaces has a maximum height of 5 μm to 50 μm.

5. The recording medium cartridge of claim 1, wherein the coefficient of dynamic friction of the boundary surfaces is 0.1 or less.

6. The recording medium cartridge of claim 1, wherein a combination of the resin-fabricated components that slide against one another includes a component fabricated of a resin selected from materials which include at least one of polycarbonate, acrylonitrile butadiene styrene and polystyrene as a major constituent and a component fabricated of a resin selected from materials which include at least one of polyacetal, polyamide and polyethylene as a major constituent.

7. The recording medium cartridge of claim 1, wherein the resin-fabricated components that slide against one another are urged, respectively, in one direction and an opposite direction.

8. A method of producing a recording medium cartridge which includes a recording medium and a plurality of components fabricated of resin, the method comprising applying a mixture which includes perfluorocarbon, perfluoropolyethylene and polytetrafluoroethylene to at least one of boundary surfaces at which, of the plurality of resin-fabricated components, resin-fabricated components of different material will slide against one another.

9. The method of producing a recording medium cartridge of claim 8, wherein the mixture includes, in percentages by mass, 90%±5% of the perfluorocarbon, 3%±2% of the perfluoropolyethylene and 7%±3% of the polytetrafluoroethylene.

10. The method of producing a recording medium cartridge of claim 8 wherein, after the perfluorocarbon has evaporated from the mixture, the amount by mass of the mixture is from 0.01 mg/cm$^2$ to 0.07 mg/cm$^2$.

11. The method of producing a recording medium cartridge of claim 8, wherein a combination of the resin-fabricated components that slide against one another includes a component fabricated of a resin selected from materials which include at least one of polycarbonate, acrylonitrile butadiene styrene and polystyrene as a major constituent and a component fabricated of a resin selected from materials which include at least one of polyacetal, polyamide and polyethylene as a major constituent.

* * * * *